United States Patent

[11] 3,578,777

[72] Inventor William J. DeGain
    Warren, Mich.
[21] Appl. No. 832,352
[22] Filed June 11, 1969
[45] Patented May 18, 1971
[73] Assignee Koppy-Tool Corporation
    Ferndale, Mich.

[54] CORRUGATED TUBING
    28 Claims, 8 Drawing Figs.
[52] U.S. Cl. .................................... 138/121,
    138/122, 138/173, 180/78
[51] Int. Cl. ..................................... F16l 9/06,
    F16l 11/12
[50] Field of Search............................ 138/173,
    121, 122, 178, 177, (Cursory), 119; 161/132, 133;
    180/78

[56] References Cited
UNITED STATES PATENTS
| | | | |
|---|---|---|---|
| 530,305 | 12/1894 | Hall............................. | 138/173 |
| 1,160,554 | 11/1915 | White........................... | 138/173X |
| 1,864,861 | 6/1932 | Schaller........................ | 138/122X |

Primary Examiner—Laverne D. Geiger
Assistant Examiner—Richard J. Sher
Attorney—Hauke, Gifford & Patalidis ABSTRACT: A corrugated tubing in which either the corrugation peak or root portions respectively and selectively are provided with longitudinal annularly spaced depressions or bulges connecting adjacent corrugation surfaces and in which selected peak or root diameters selectively may be different than the remaining peak or root diameters, such tubing when used as an energy-absorbing device having thereby a predetermined resistance of the corrugations to axial collapse loads and producing controlled degree and order of their collapse on subjecting the tubing to such axial loads.

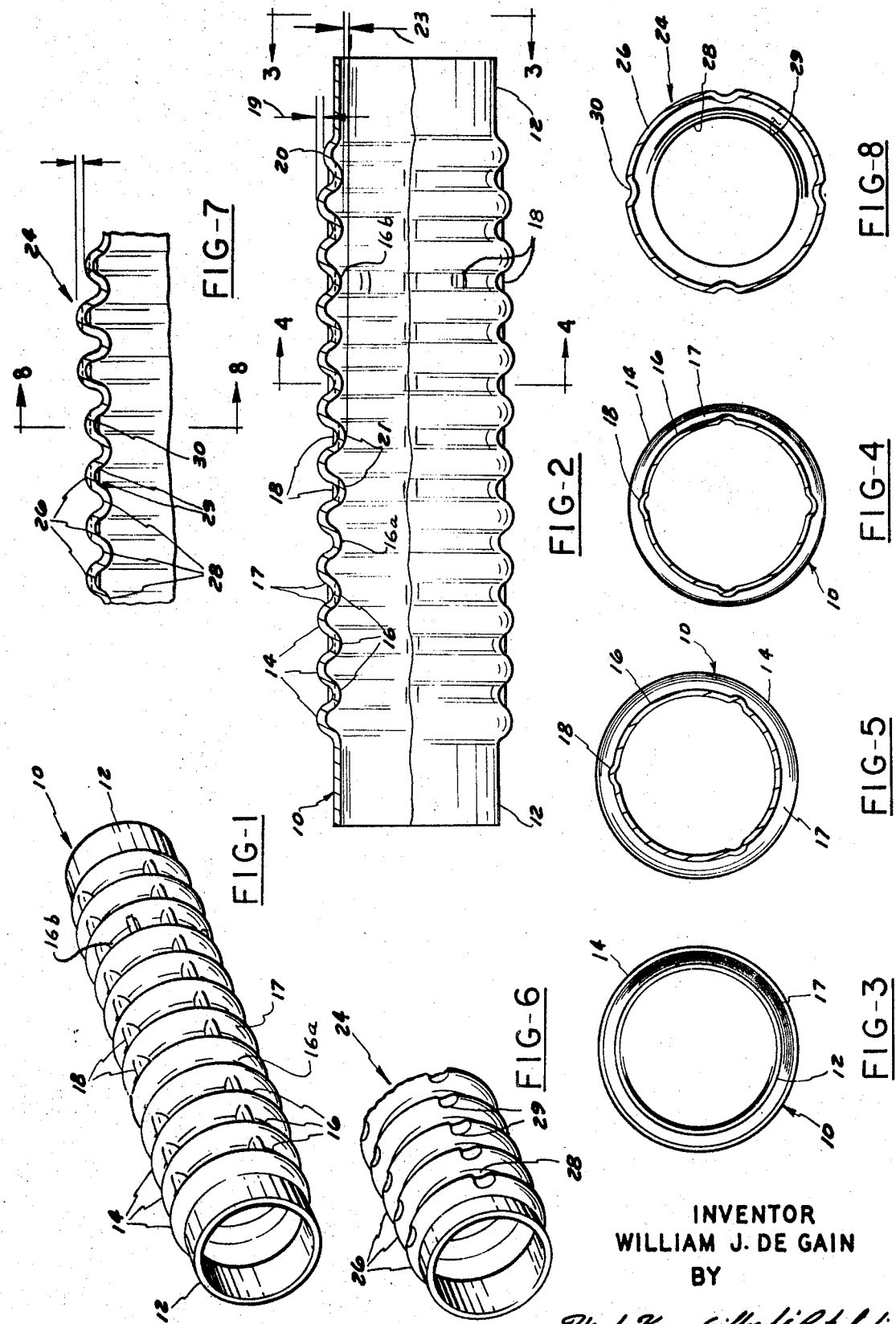
INVENTOR
WILLIAM J. DE GAIN

CORRUGATED TUBING

BACKGROUND OF THE INVENTION

1. Field of the Invention

My invention relates to corrugated tubes, such as are used in energy-absorbing columns and the like where it is desired to produce a controllable collapse of the tube when subjected to predetermined axial loads.

2. Description of the Prior Art

Collapsible corrugated tubes heretofore developed for use in energy-absorbing systems and the like are not easily provided with the predictable collapse characteristics desired. In my copending patent applications, Ser. Nos. 621,948; 634,747 (now U.S. Pat. Nos. 3,461,531 and 3,457,762, respectively); and Ser. No. 627,718. I have described and shown various corrugated tube configurations and methods for manufacturing same in which the finished product to a great extent has such predetermined collapse characteristics, and the present application discloses a further improvement in corrugated tubing, particularly an energy-absorbing corrugated tube construction which will not only collapse under a predetermined load but also provides corrugations having a predetermined collapse order, each corrugation being selectively and specifically tailored to perform in a predictable fashion.

SUMMARY OF THE INVENTION

The present corrugated tube, in which the adjacent corrugations are defined by annular radiused peak and root portions of respectively greater and lesser diameters, has deformations provided in one or more of such portions at selected annularly spaced areas thereof to form longitudinally extending ribs connecting adjacent corrugations to strengthen the tubular member in such areas against axial loads. The diameters of the peak and root portions may be optionally varied in fabrication so that when the tubular member, being used as an energy-absorbing device, is subjected to an axial collapse load, it will begin to collapse in those areas which, because of either having fewer ribs, or having selectively different diameters, or different corrugation volumes, will begin to collapse in a preselected section, with the remaining corrugated sections collapsing in order successively starting with those corrugations adjacent the weaker sections. Selective additions or deletions of the ribs or volume deformations may be readily made or changed during development, without the high cost and time which is normally involved in making major material and dimensioning changes to achieve desired results.

DESCRIPTION OF THE DRAWINGS

For a more complete understanding of my invention, reference may be had to the accompanying drawing illustrating preferred embodiments of the invention in which like reference characters refer to like parts throughout the several views, and in which:

FIG. 1 is a perspective view of a corrugated tube embodying the invention;

FIG. 2 is a longitudinal partially cross-sectioned view of the tubing of FIG. 1;

FIG. 3 is an end view of the tubing of FIG. 2 as seen substantially from the line 3-3 thereof;

FIG. 4 is a cross-sectional view taken substantially on the line 4-4 of FIG. 2;

FIG. 5 is a cross-sectional view similar to that of FIG. 4 but illustrating a modified structure;

FIG. 6 is another perspective view of a corrugated tube embodying another modification of my invention;

FIG. 7 is a longitudinal partially cross-sectioned view of the tubing of FIG. 6; and FIG. 8 is a cross-sectional view taken substantially on the line 8-8 of FIG. 7.

DESCRIPTION OF THE PREFERRED EMBODIMENTS

FIGS. 1 through 4 illustrate a tubular member 10 having uniform diameter ends 12 and an intermediate corrugated surface in which preferably equally axially spaced annular corrugations are defined by alternately adjacent radiused peaks 14 and roots 16 connected by intermediate sloped corrugation sidewalls 17. The roots 16 are deformed to provide selectively sized bulges at annularly spaced areas to form longitudinally extending ribs 18 connecting adjacent corrugation sidewalls 17 as shown.

The structural configuration shown will exhibit a certain resistance to axial loads applied to the tubular member depending upon a number of factors which are controlled in the fabrication to predetermine the collapse load characteristics of the member. For example, in the preferred embodiment of FIGS. 1 through 4, there are generally provided four ribs 18 equally annularly spaced across each of the corrugation roots but for purposes to be described any of the roots 16 may have such ribs deleted as in the root 16a, or selectively any of the roots may be provided with more ribs 18 as in the root 16b which is indicated to have eight ribs. FIG. 5 illustrates another embodiment in which there are only three of these ribs. Any corrugation of any tubular member may be constructed with any quantity of ribs desired, and in selected areas of the tubular member, there will be fewer or greater numbers of ribs depending upon the axial strength desired in any particular area which can be determined at any time during development. Furthermore, the size of the deformations is carefully controlled in the fabrication to achieve a similar effect, that is the smaller the deformation producing the rib, the weaker the tube will be in that area, and conversely the greater the deformation, the greater the strength against axial loads in that area. Another factor in the fabrication which is carefully controlled to produce selective areas of strength and weakness are the shape and size of the corrugations themselves. As indicated in FIG. 2, the diameter of a peak 20 of the right end corrugation is less than the diameters of the remaining corrugation peaks 14 as shown by the arrows. Thus the end corrugation is stronger and will more readily resist collapse when the member is subjected to the selected load. Also, as shown by the arrows 23 in FIG. 2, some of the corrugation roots as at 21 have a smaller diameter than the roots on either side thereof, and the corrugations in this area will be weaker than the other corrugations. The FIG. 2 modification when subjected to a collapse load will start to collapse in the central weaker area and as a result the corrugations will collapse progressively from the center toward the ends of the member. The above variables permit development of tubes by making only minor die changes, merely by deleting a piece of a die or replacing a portion, eliminating such major changes as wall thickness and material selection which necessitates drastic changes in design.

FIGS. 6, 7 and 8 illustrate another modification of the invention in which a tubular member 24 has a series of preferably equally axially spaced annular corrugations defined by annular radiused peaks 26 and roots 28 connected by intermediate sloped corrugation sidewalls 29 in which annularly spaced deformations are provided in at least some of the peaks (rather than the roots) to provide longitudinally extending ribs 30 connecting adjacent corrugation sidewalls as shown to provide additional strength of the corrugations resisting axial loads. Again, the shape and size of the corrugations, the quantity and size of the deformations, as well as the root and peak diameters are controlled to produce whatever collapse characteristics are desired in the tubular member.

The ribs 18 or 30 are preferably equally annularly spaced in the modifications shown so that the tube will tend to collapse uniformly along a straight line but the ribs could be unequally annularly spaced and the tube when subjected to a collapse load would then tend to bend in such an area, which may be a desired characteristic in certain circumstances. Variations in rib sizes may also be used as a factor in determining the strength characteristics of each corrugation.

The end result in all cases is the provision of a tubular member which can be used as a structural and functional component of, for example, a vehicle-steering column in all normal operational circumstances, but which will, when experiencing a predetermined axial load, as in a collision, collapse at a controlled rate and in a controlled fashion to predictably absorb the energy of such a load.

Furthermore, the ribs 18 or 30 are such that in collapse of the member under load the resistance to collapse will not fall off during collapse but will provide a substantially uniform strength characteristic in the corrugations even during their compression. Without such ribs, as corrugations collapse the angles of the corrugation sidewalls approach more nearly a normal angle relative to the axis of the tube and thus their loading falls off progressively. Therefor, a broad range of selectivity in loading of each individual corrugation gives a capability of controlling the strength characteristic of the tube as a whole and in all sections not heretofor possible. The cost and effort of changing the characteristics is radically decreased.

Although I have described only a few modifications of my invention, it will be apparent to one skilled in the art to which the invention pertains that various changes and modifications may be made therein without departing from the spirit of the invention as expressed by the scope of the following claims.

I claim:

1. A tubular member having an annularly corrugated surface for at least a portion of its length, the corrugations being defined by annular radiused peak and root portions of respectively greater and lesser diameters connected by intermediate sloped corrugation sidewalls, one or more portions having deformations at annularly spaced areas to form longitudinally extending ribs connecting adjacent sidewalls to strengthen the member in such areas against axial loads, one or more of said rib-forming deformations comprising an outward bulge in one or more root portions longitudinally connecting adjacent corrugation sidewalls, the maximum radial projection of said bulge with respect to the longitudinal axis of said tubular member being less than the radius of adjacent peak portions.

2. The structure as defined in claim 1 and having such rib-forming deformations in all of such root portions.

3. The structure as defined in claim 1 and in which at least some of said rib-forming deformations are equally annularly spaced.

4. The structure as defined in claim 1 and in which the root diameters of one or more corrugations are greater than the root diameters of other corrugations.

5. The structure as defined in claim 5 and in which the greater diameter roots are disposed intermediate the lesser diameter roots.

6. The structure as defined in claim 5 and in which the peak diameters of substantially all corrugations are equal.

7. The structure as defined in claim 1 and in which the axial spacings of said peaks and said roots are substantially equal.

8. The structure as defined in claim 1 and in which the peak diameters of one or more corrugations are greater than the peak diameters of other corrugations.

9. The structure as defined in claim 8 and in which the greater diameter peaks are disposed intermediate the lesser diameter peaks.

10. The structure as defined in claim 8 and in which the root diameters of substantially all corrugations are equal.

11. The structure as defined in claim 1 and in which one or more of said portions are provided with a lesser number of said ribs than other of said portions.

12. The structure as defined in claim 1 and in which the size of one or more of said deformations is greater than other of said deformations.

13. An energy-absorbing structure comprising a tubular member having an annularly corrugated surface for at least a portion of its length, the corrugations defined by annular radiused peak and root portions of respectively greater and lesser diameters connected by intermediate sloped corrugation sidewalls, selected portions having selected numbers of annularly spaced deformations, the size of one or more of said deformations being greater than other of said deformations to provide longitudinally extending ribs connecting adjacent sidewalls to strengthen the member to a predetermined degree in such areas against axial loads, said corrugations of said tubular member being of selectively different shapes and sizes, whereby to predetermine collapse load characteristics of each corrugation of said tubular member and the order in which said corrugations will collapse when subjected to such load.

14. A tubular member having an annularly corrugated surface for at least a portion of its length, the corrugations being defined by annular radiused peak and root portions of respectively greater and less diameters connected by intermediate sloped corrugation sidewalls, one or more portions having deformations at annularly spaced areas to form longitudinally extending ribs connecting adjacent sidewalls to strengthen the member in such areas against axial loads, one or more of said rib deformations comprising an inward depression in one or more peak portions longitudinally connecting adjacent corrugation sidewalls.

15. The structure defined in claim 14 and in which at least some of said rib-forming deformations are equally annularly spaced.

16. The structure defined in claim 14 and in which the root diameters of one or more corrugations are greater than the root diameters of other corrugations.

17. The structure defined in claim 16 and in which the greater diameter roots are disposed intermediate the lesser diameter roots.

18. The structure defined in claim 16 and in which the peak diameters of substantially all corrugations are equal.

19. The structure defined in claim 14 and in which the axial spacings of said peaks and said roots are substantially equal.

20. The structure defined in claim 14 and in which the peak diameters of one or more corrugations are greater than the peak diameters of other corrugations.

21. The structure defined in claim 20 and in which the greater diameter peaks are disposed intermediate the lesser diameter peaks.

22. The structure defined in claim 20 and in which the root diameters of substantially all corrugations are equal.

23. The structure as defined in claim 14 and in which one or more of said portions are provided with a lesser number of said ribs than other of said portions.

24. The structure as defined in claim 14 and in which the size of one or more of said deformations is greater than other of said deformations.

25. The structure as defined in claim 17 and having such rib-forming deformations in all of such peak portions.

26. A tubular member having an annularly corrugated surface for at least a portion of its length, the corrugations being defined by annular radiused peak and root portions of respectively greater and lesser diameters connected by intermediate sloped corrugation sidewalls, one or more portions having deformations at annularly spaced areas to form longitudinally extending ribs connecting adjacent sidewalls to strengthen the member in such areas against axial loads, the size of one or more of said deformations being greater than other of said deformations.

27. A tubular member having an annularly corrugated surface for at least a portion of its length, the corrugations being defined by annular radiused peak and root portions of respectively greater and lesser diameters connected by intermediate sloped corrugation sidewalls, more than one of said portions have deformations at annularly spaced areas to form longitudinally extending ribs connecting adjacent sidewalls to strengthen the member in such areas against axial loads, and at least one nondeformed root portion intermediate said deformed portions.

28. The structure defined in claim 27 in which one of said portions has a greater number of said rib deformations than another of said portions.

KTD-108-B

UNITED STATES PATENT OFFICE
CERTIFICATE OF CORRECTION

Patent No. 3,578,777      Dated May 18, 1971

Inventor(s) William J. DeGain

It is certified that error appears in the above-identified patent and that said Letters Patent are hereby corrected as shown below:

IN THE SPECIFICATION

Column 1, line 16, after "627,718" insert

- - filed April 3, 1967 (now abandoned) - -

Column 2, line 39, after "arrows" insert - - 19 - -

Signed and sealed this 31st day of August 1971.

(SEAL)
Attest:

EDWARD M. FLETCHER, JR.      WILLIAM E. SCHUYLER, JR.
Attesting Officer      Commissioner of Patents